United States Patent [19]
Ciardi et al.

[11] Patent Number: 5,723,061
[45] Date of Patent: Mar. 3, 1998

[54] ANTIFREEZE COMPOSITION COMPRISING A WATER-SOLUBLE ALCOHOL AND A CORROSION INHIBITOR SYSTEM COMPRISING DICARBOXYLIC ACIDS OR SALTS THEREOF, DIAZOLE AND A TRIAZOLE

[75] Inventors: Claude Ciardi, Martigues; Valerie Rousselon, St Mitre les Remparts, both of France

[73] Assignee: BP Chemicals Limited, London, England

[21] Appl. No.: 621,005

[22] Filed: Apr. 23, 1996

[30] Foreign Application Priority Data

Apr. 28, 1995 [FR] France .................. 95 05438

[51] Int. Cl.$^6$ .................................................. C09K 5/00
[52] U.S. Cl. ........................ 252/79; 252/75; 252/76; 252/77
[58] Field of Search ........................ 252/76, 79, 75, 252/77

[56] References Cited

U.S. PATENT DOCUMENTS

| | | | |
|---|---|---|---|
| 4,000,079 | 12/1976 | Rasp et al. | 252/75 |
| 4,448,702 | 5/1984 | Kaes | 252/70 |
| 4,450,088 | 5/1984 | Wilson et al. | 252/75 |
| 4,584,119 | 4/1986 | Duranleau et al. | 252/75 |
| 4,588,513 | 5/1986 | Triebel et al. | 252/75 |
| 4,592,853 | 6/1986 | Darden et al. | 252/75 |
| 4,631,139 | 12/1986 | Burton et al. | 252/49.3 |
| 4,647,392 | 3/1987 | Darden et al. | 252/75 |
| 4,946,616 | 8/1990 | Falla et al. | 252/75 |
| 5,085,793 | 2/1992 | Burns et al. | 252/79 |
| 5,242,621 | 9/1993 | Miller et al. | 252/396 |
| 5,366,651 | 11/1994 | Maes et al. | 252/76 |

FOREIGN PATENT DOCUMENTS

| | | |
|---|---|---|
| 0348303 | 12/1989 | European Pat. Off. . |
| 564721 | 10/1993 | European Pat. Off. . |
| 1004259 | 9/1965 | United Kingdom . |

*Primary Examiner*—Christine Skane
*Attorney, Agent, or Firm*—Brooks Haidt Haffner & Delahunty

[57] ABSTRACT

The present invention relates to an antifreeze composition containing a water-soluble liquid alcohol and a corrosion inhibitor system comprising (a) a mixture of at least two aromatic or aliphatic dicarboxylic acids, or of at least two salts of the said acids, (b) at least one 1,3-diazole chosen from imidazole, benzimidazole, imidazoline and hydrocarbon derivatives thereof, and (c) at least one triazole compound. The aqueous fluids containing the said composition have excellent anticorrosive properties and heat stability over long periods of time, in particular when the fluids are used as heat transfer fluids at temperatures above 150° C.

11 Claims, No Drawings ically C<sub>3</sub> to C<sub>12</sub>...

ANTIFREEZE COMPOSITION COMPRISING A WATER-SOLUBLE ALCOHOL AND A CORROSION INHIBITOR SYSTEM COMPRISING DICARBOXYLIC ACIDS OR SALTS THEREOF, DIAZOLE AND A TRIAZOLE

The present invention relates to a water-soluble antifreeze composition containing a corrosion inhibitor system and an aqueous heat transfer fluid containing the said composition, and to a process for the treatment of an aqueous heat transfer fluid in order to reduce the corrosion of the metals or alloys in contact with the said fluid.

It is known to use aqueous heat transfer fluids in heat exchangers such as central heating circuits or internal combustion engine cooling circuits. Generally, the heat transfer fluid comes into contact with various metals or alloys which form the different parts of these circuits, for example such as copper, brass, steel, cast iron, magnesium, aluminium and alloys of tin and lead which form solders. Thus, the problems of corrosion become particularly difficult and complex, not only because of the need to protect each of the metals or alloys against corrosion individually, but also because of galvanic corrosion phenomena winch may occur between the various metals or alloys present.

In the case of certain heat exchanger circuits such as those for cooling internal combustion engines, in particular those operating on motor vehicles, the problems of protection against corrosion involve, in particular, aqueous heat transfer fluids containing antifreeze compositions. The antifreeze compositions essentially comprise a water-soluble organic compound which lowers the freezing point of the heat transfer fluid, in particular a liquid alcohol such as a glycol, for example monoethylene glycol or monopropylene glycol. Corrosion inhibitors are generally added to these compositions, in low proportion. The antifreeze compositions thus obtained are then used as a mixture with water in order to prepare the ready-to-use aqueous heat transfer fluid. The weight ratio of the amount of antifreeze composition to that of water is determined by the desired freezing point of the fluid.

Patent application EP-0,564,721-A describes an antifreeze composition containing a corrosion inhibitor system comprising (1) a $C_5$ to $C_{16}$ aliphatic monocarboxylic acid or an alkali metal, ammonium or amine salt of the said acid, (2) a hydrocarbon compound of triazole and (3) imidazole. Despite having a satisfactory buffer power and reserve alkalinity, the composition was not observed to have a sufficient resistance to severe thermal stresses over long periods of time.

Indeed, internal combustion engines, in particular those of motor vehicles, generally operate at very high temperatures such that the aqueous heat transfer fluids circulating in the cooling circuits are in contact with metal parts of the engine with skin temperatures reaching 180° C. or more. Thus, the temperature of the aqueous heat transfer fluids may reach 150° C. or more locally. Because of these severe thermal stresses, the antifreeze compositions and the corrosion inhibitor systems present in these fluids have a tendency to degrade. Generally, this degradation is reflected by a gradual change in the pH value of the aqueous fluids over time. The pH value may, for example, increase towards values of 9 to 11, thereby leading to considerable problems of corrosion of aluminium or of its alloys. The pH value may, on the other hand, decrease towards values very much lower than 7, thereby indicating the loss of efficiency of the corrosion inhibitor system of the composition. Thus, the antifreeze compositions and the corrosion inhibitor systems present in these fluids may have shortened lifetimes and loose their anticorrosive properties more quickly.

Patent application GB-1,004,259-A discloses a corrosion inhibitor composition comprising a mixture of benzotriazole and/or methylbenzotriazole and an alkali metal, ammonium, amine or alkanolamine salt of a $C_6$ to $C_{30}$ saturated dicarboxylic acid. However, it was observed that in order to provide an antifreeze composition having a satisfactory buffer capacity with a reserve alkalinity equal to or higher than 10, the dicarboxylic acid has to be present in the antifreeze composition in a relatively large amount. Such a dicarboxylic acid used at a relatively high concentration generally can present solubility difficulty in a mixture of water with water-soluble liquid alcohol, and may precipitate or crystallize in some parts of heat transfer circuits such as water pumps.

Patent application EP-0, 348 303-A discloses an antifreeze composition containing a corrosion inhibitor system comprising a saturated aliphatic dicarboxylic acid e.g. succinic acid, sodium benzoate and benzo- or tolyltriazole.

U.S. Pat. No. 5,242,621-A discloses a heat transfer fluid corrosion inhibitor composition comprising the combination of alkanoic acid or salt, hydrocarbyl dicarboxylic acid or salt, and carbocyclic-substituted alkanoic acid or salt. It is particularly said that the corrosion inhibitor combination has been found to give enhanced corrosion protection in the absence of other corrosion inhibitors, such as triazoles.

One of the aims of the present invention is to provide an antifreeze composition containing a corrosion inhibitor system which makes it possible to ensure the heat stability and the resistance to degradation of the aqueous heat transfer fluids containing the said composition and to avoid precipitation or crystallization. More particularly, the present invention makes it possible to prolong very substantially the lifetime of the aqueous heat transfer fluids in service in the cooling circuits of an internal combustion engine, and to solve the above problems. It has been found, in particular, that the stability of the pH and the resistance to thermal shocks of aqueous fluids containing the antifreeze composition of the present invention are greatly increased, in particular at running temperatures of above 150° C., such that the anticorrosive properties of the composition and of the aqueous fluids containing it are maintained at a high level for a particularly long time.

The subject of the present invention is thus an antifreeze composition comprising a water-soluble liquid alcohol which lowers the freezing point, and a corrosion inhibitor system, characterized in that the corrosion inhibitor system comprises:

(a) a mixture of at least two aromatic or aliphatic dicarboxylic acids, or of at least two alkali metal, ammonium or amine salts of the said acids, (b) at least one 1,3-diazole chosen from imidazole, benzimidazole, imidazoline and the hydrocarbon derivatives thereof, and (c) at least one triazole compound.

According to the invention, the composition comprises a mixture of at least two, e.g. three aromatic or aliphatic dicarboxylic acids containing, in particular, from 3 to 16 and preferably from 4 to 12 carbon atoms, or the corresponding alkali metal, ammonium or amine salts. $C_3$ to $C_{16}$, preferably $C_3$ to C12, aliphatic dicarboxylic acids are preferably used, in particular those containing an unsaturated carbon chain, such as itaconic acid or muconic acid, or those containing a saturated carbon chain, or the corresponding alkali metal, ammonium or amine salts. $C_3$ to $C_{16}$, preferably $C_3$ to $C_{12}$, aliphatic dicarboxylic acids containing a saturated carbon chain are most particularly preferred, and in particular those chosen from the group consisting of malonic acid, aspartic acid, glutamic acid, glutanic acid, succinic acid, glutaric acid, adipic acid, azelaic acid and sebacic acid, or the corresponding alkali metal, ammonium or amine salts.

Each of the at least two acids may preferably be chosen from two distinct groups. The first group consists of $C_3$ to $C_6$ aliphatic dicarboxylic acids such as malonic acid, succinic acid, fumaric acid, itaconic acid, maleic acid, aspartic acid, muconic acid, adipic acid glutaric acid, glutamic acid and glutanic acid. The second group consists of $C_7$ to $C_{16}$ aromatic or aliphatic dicarboxylic acids such as azelaic acid, sebacic acid, methyleneazelaic acid, phthalic acid and naphthalenedicarboxylic acids. The second group preferably consists of $C_7$ to $C_{16}$, particularly $C_7$ to $C_{12}$ aliphatic dicarboxylic acids.

Each of the acids or of the salts thereof may be present in the mixture of acids or salts in weight proportions of at least 10% and of at most 90%, preferably of at least 20% and of at most 80%, these proportions being based on the mixture of acids or of salts used in the composition and the sum of which is equal to 100%.

The composition may contain from 0.1 to 10%, preferably from 0.5 to 7%, in particular from 1 to 5% by weight of the mixture of dicarboxylic acids or of salts thereof. These weight percentages and those given later are based on the antifreeze composition, it being understood that the composition moreover contains or may contain other additives.

It has been observed that the composition according to the invention may advantageously be free of monocarboxylic acid or of an alkali metal, ammonium or amine salt of a monocarboxylic acid, or preferably be free of aliphatic monocarboxylic acid or salt thereof.

The composition moreover comprises at least one 1,3-diazole chosen from imidazole, benzimidazole, imidazoline and the hydrocarbon derivatives thereof. It may contain from 0.01 to 2% and preferably from 0.02 to 1% by weight of at least one 1,3-diazole.

More particularly, the 1,3-diazole may be chosen from:

imidazole or the N- and/or C-substituted alkyl, aryl or aralkyl derivatives of imidazole corresponding in particular 16 the formula:

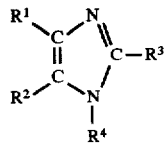 (I)

in which $R^1$, $R^2$ and $R^3$, being identical or different, represent a hydrogen atom or a linear or branched alkyl radical, in particular a $C_1$ to $C_6$ and preferably a $C_1$ to $C_4$ alkyl radical such as the methyl or ethyl radical, or an aryl radical, in particular a $C_6$ to $C_{12}$ and preferably a $C_6$ to $C_{10}$ aryl radical such as die phenyl or naphthyl radical, or an aralkyl radical, in particular a $C_7$ to $C_{14}$ and preferably a $C_7$ to $C_{11}$ aralkyl radical such as the benzyl radical, and $R^4$ represents, preferably, a hydrogen atom, or a hydrocarbon radical, for example an alkyl, aryl or aralkyl radical, in particular a $C_1$ to $C_{14}$ alkyl, aryl or aralkyl radical, such as the methyl, ethyl, phenyl or benzyl radicals and which may contain in particular at least one amine function, preferably a tertiary amine function, and/or optionally at least one alcohol function, e.g. an ethoxylated imidazole.

benzimidazole or the N- and/or C-substituted alkyl, aryl or aralkyl derivatives of benzimidazole corresponding in particular to the formula:

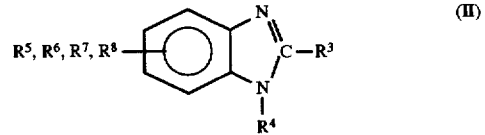 (II)

in which $R^3$ and $R^4$ have the same definitions as above. $R^3$ moreover representing the —SH radical or a —S (CH$_2$—CH$_2$—O)$_x$—H radical wherein x is a number from 1 to 100, preferably from 1 to 10 or 1 to 5 (e.g. a C— substituted ethoxylated mercapto -2 benzimidazole), R4 moreover representing a —(CH$_2$—CH$_2$—O)$_y$—H radical wherein y is a number from 1 to 100, preferably from 1 to 10 or 1 to 5, and $R^5$, $R^6$, $R^7$ and $R^8$, being identical or different, represent a hydrogen atom or a linear or branched alkyl radical, in particular a $C^1$ to $C^6$ and preferably a $C^1$ to $C^4$ alkyl radical such as the methyl or ethyl radical, e.g. an ethoxylated benzimidazole and imidazoline or the N- and/or C-substituted alkyl, aryl or aralkyl derivatives of imidazoline corresponding in particular to the formula:

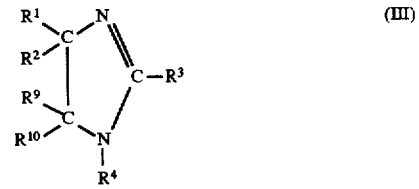 (III)

in which $R^1$, $R^2$, $R^3$ and $R^4$ have the same definitions as given above in formula (II) and $R^9$ and $R^{10}$, being identical or different, have the same definitions as those of $R^1$ and $R^2$.

Benzimidazole or one of the hydrocarbon derivatives of benzimidazole or imidazole is preferably used. More particularly, imidazole or one of the hydrocarbon derivatives of imidazole is preferably used.

The composition also comprises at least one triazole compound which may be present in a proportion of from 0.01 to 1% and preferably of from 0.05 to 0.6% by weight. The triazole compound is preferably a hydrocarbon compound of triazole, in particular an N- and/or C-substituted derivative of triazole. An aromatic triazole compound is preferred, such as benzotriazole or tolyltriazole, or alternatively an N-substituted benzotriazole or tolyltriazole derivative such as that sold by CIBA GEIGY under the reference "Irgamet 42"®, in particular of formula:

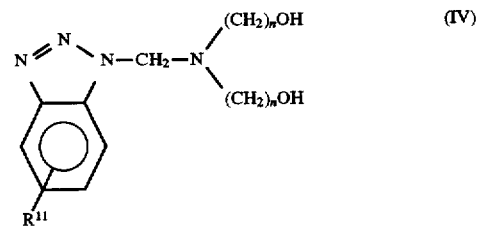 (IV)

in which n=1 or 2 and $R^{11}$ represents a hydrogen atom or an alkyl radical, in particular a $C_1$ to $C_4$ alkyl radical such as the methyl radical. A mixture of at least two aromatic triazole compounds, particularly of benzotriazole and tolyltriazole, is preferred and gives in the present composition a remarkable synergy effect on the improvement of the aluminium and copper protections. In the mixture, the weight ratio e.g. of tolyltriazole to benzotriazole may be from 1:10 to 10:1, e.g. 4:1.

The composition may moreover advantageously comprise at least one $C_5$ to $C_{12}$ polyol containing from 5 to 12 alcohol functions and possessing no reductive power. A polyol chosen from pentols, hexols and sugars possessing no reductive power may be used in particular. Sorbitol, xylitol, mannitol or sucrose is preferably used.

The composition may also comprise an inorganic base, such as sodium hydroxide or potassium hydroxide, which is intended to neutralize the dicarboxylic acids present in the said composition, and to form the corresponding salts, in stoechiometric mounts.

The composition may also comprise antifoaming agents e.g. silicones or (poly)siloxanes, antifouling or anti-incrustation agents, or stabilizers or agents for sequestering alkaline-earth metals or other metal ions, in particular divalent ions, which may be present in the water used to prepare the aqueous heat transfer fluids. The composition may furthermore comprise at least one silane, and/or at least one imide, and/or at least one tetrazole, and/or at least one phosphonate, and/or specific inhibitors e.g. <REOCOR 190> ® or <REOCOR 152> ® sold by CIBA-GEIGY, and/or at least one aromatic carboxylic acid or salt thereof e.g. sodium benzoate.

It has been found that the combination of a mixture of at least two dicarboxylic acids or the salts thereof such as those mentioned above with at least one 1,3-diazole and at least one triazole compound has a surprising synergy effect, so as to ensure the stability of the pH and to improve the heat resistance of the aqueous heat transfer fluids containing the composition according to the invention, in particular when the fluids are subjected to high temperatures, for example temperatures above 150° C., and similarly to prolong the possible duration of use of these fluids. Moreover, no precipitation nor crystallization occurs in the aqueous heat transfer fluids containing the composition according to the invention.

It has moreover been observed that excellent results are obtained as regards the thermal stability of the aqueous fluids, in particular when the composition is substantially free of silicate, phosphate, molybdate and/or borate of an alkali metal, and/or of nitrite or nitrate of an alkali metal or alkaline-earth metal. The composition may, in particular, be substantially free of any inorganic salt, except for salts of the three main constituents of the said composition.

The antifreeze composition contains, as essential or major component by weight, a water-soluble liquid alcohol which makes it possible to lower the freezing point. The liquid alcohol is generally a glycol or a glycol ether. The glycol or the glycol ether which may be used includes a glycol such as monoethylene glycol, diethylene glycol, monopropylene glycol or dipropylene glycol, or a glycol ether such as the methyl, ethyl, propyl or butyl ether of monoethylene glycol, of diethylene glycol, of monopropylene glycol or of dipropylene glycol. Monoethylene glycol or monopropylene glycol is particularly preferred.

The present invention thus relates to an aqueous heat transfer fluid having a lowered freezing point, containing water and from 10 to 90%, preferably from 25 to 65%, by weight, of the antifreeze composition described above and containing in particular the combination of the corrosion inhibitor system, the weight percentages being based on the aqueous heat transfer fluid.

The present invention also relates to a process for the treatment of an aqueous fluid, in particular a heat transfer fluid, containing a water-soluble liquid alcohol which lowers the freezing point, in order to reduce the corrosion of metals in contact with the fluid, by addition of a corrosion inhibitor system, characterized in that the corrosion inhibitor system comprises:

(a) a mixture of at least two aromatic or aliphatic dicarboxylic acids, or of at least two alkali metal, ammonium or amine salts of the said acids, such as those mentioned and described above, (b) at least one 1,3-diazole chosen from imidazole, benzimidazole, imidazoline and the hydrocarbon derivatives thereof, and (c) at least one triazole compound.

The corrosion inhibitor system used in the treatment of an aqueous fluid may moreover advantageously comprise other additives and may also be substantially free of inorganic salts, such as those mentioned above.

The present invention is illustrated by the following antifreeze compositions:

|  | % by weight |
| --- | --- |
| Composition A: |  |
| monoethylene glycol | 94.2 |
| sebacic acid | 2.0 |
| succinic acid | 1.6 |
| benzimidazole | 0.05 |
| tolyltriazole | 0.2 |
| sodium hydroxide | 1.95 |
| Composition B |  |
| monoethylene glycol | 94.95 |
| sebacic acid | 1.4 |
| succinic acid | 1.5 |
| imidazole | 0.25 |
| tolyltriazole | 0.3 |
| sodium hydroxide | 1.6 |
| Composition C |  |
| monoethylene glycol | 95.025 |
| sebacic acid | 1.5 |
| succinic acid | 1.4 |
| imidazole | 0.25 |
| tolyltriazole | 0.2 |
| benzotriazole | 0.025 |
| sodium hydroxide | 1.6 |

The present invention is also illustrated by the examples which follow.

EXAMPLE 1

An antifreeze composition based on monoethylene glycol is prepared, this composition containing by weight:

|  | % by weight |
| --- | --- |
| monoethylene glycol | 96.165 |
| sebacic acid | 1.0 |
| succinic acid | 0.4 |
| adipic acid | 0.6 |
| imidazole | 0.5 |
| tolyltriazole | 0.3 |
| sodium hydroxide | 1.035 |

Using this antifreeze composition, aqueous fluids are prepared with which various measurements are taken and various tests are carried out. Thus, the following are measured:

the pH according to the method ASTM-D-1287 (at a concentration of 33% by volume in aqueous solution): pH=8.3 the reserve alkalinity (R.A.) according to the method ASTM-D-1121: RA=12.6 ml N/10 HCl the anticorrosive properties according to the glassware corrosion test according to the method NF R 15-602-7:

| metal/alloy | variation in weight/specimen (in mg) |
|---|---|
| copper | −2.0 |
| solder | −0.8 |
| brass | −2.0 |
| steel | +0.4 |
| cast iron | +1.5 |
| aluminium | −1.0 | the test of corrosion by heat transfer on aluminium alloy according to the method NF R 15-602-8:

| | before test | after test |
|---|---|---|
| pH | 8.4 | 8.4 |

Rate of corrosion (mg/cm$^2$/week): −0.02

The thermal stability test in the presence of an aluminium alloy at high temperature (160° C.), according to the method PSA-D 55 5345 (April 1991) for 500 hours instead of 240 hours:

| | before test | after test |
|---|---|---|
| pH | 8.3 | 8.2 |
| R.A. (ml 0.1 N HCl) | 12.6 | 12.4 |

R.A.: Reserve Alkalinity
Volume of deposit <0.1 ml

EXAMPLE 2 (comparative)

An antifreeze composition based on monoethylene glycol is prepared, this composition containing by weight:

| | % by weight |
|---|---|
| monoethylene glycol | 95.336 |
| 2-ethyl hexanoic acid | 3.0 |
| imidazole | 0.5 |
| tolyltriazole | 0.3 |
| sodium hydroxide | 0.864 |

Using this antifreeze composition, aqueous fluids are prepared with which various measurements are taken and various tests are carried out. Thus, the following are measured:

the pH according to the method ASTM-D-1287 (at a concentration of 33% by volume in aqueous solution):

pH=8.1 the reserve alkalinity (R.A.) according to the method ASTM-D-1121: RA=10.2 ml N/10 HCl the anti corrosive properties according to the glassware corrosion test according to the method NF R 15-602-7:

| metal/alloy | variation in weight/specimen (in mg) |
|---|---|
| copper | −2.0 |
| solder | −2.2 |
| brass | −1.4 |
| steel | −0.8 |
| cast iron | −1.2 |
| aluminium | −3.6 | the test of corrosion by heat transfer on aluminium alloy according to the method NF R 15-602-8:

| | before test | after test |
|---|---|---|
| pH | 8.5 | 7.9 |

Rate of corrosion (mg/cm$^2$/week): −0.22

The test of corrosion by heat transfer on aluminium alloy shows that the antifreeze composition of Example 1 exhibits a much better protection for aluminium at high temperature (150 ° C.) than the antifreeze composition of Example 2 (comparative).

The glassware corrosion test also shows a much higher protection for solder and aluminium in Example 1 than in Example 2 (comparative).

EXAMPLE 3

An antifreeze composition based on monoethylene glycol is prepared, this composition containing by weight:

| | % by weight |
|---|---|
| sebacic acid | 1.0 |
| succinic acid | 1.6 |
| benzimidazole | 0.05 |
| tolyltriazole | 0.25 |
| sodium hydroxide (in an amount for obtaining pH = 8.0) | |
| monoethylene glycol (in an amount to complete the composition up to 100 %) | |

The following test is used for identifying problems relating to precipitation or crystallization.

A volume of 1 ml of the above-mentioned antifreeze composition is isolated and heated during 2 hours at 80° C. up to a complete evaporation. At the end of this period, a deposit is formed in the form of a gel and no crystals are observed.

EXAMPLE 4 (comparative)

An antifreeze composition based on monoethylene glycol is prepared, this composition containing by weight:

| | % by weight |
|---|---|
| sebacic acid | 3.8 |
| benzimidazole | 0.05 |
| tolyltriazole | 0.25 |
| sodium hydroxide (in an amount for obtaining pH = 8.0) | |
| monoethylene glycol (in an amount to complete the composition up to 100%) | |

This antifreeze composition exhibits a reserve alkalinity identical to that of the antifreeze composition of Example 3. The test identical to that used in Example 3 for identifying problem of precipitation or crystallization is carried out with the present composition and Shows a solid deposit in the form of large crystals.

EXAMPLE 5

An antifreeze composition based on monoethylene glycol is prepared, this composition containing by weight:

|  | % by weight |
| --- | --- |
| sebacic acid | 1.9 |
| succinic acid | 1.4 |
| benzimidazole | 0.05 |
| tolyltriazole | 0.2 |
| sodium hydroxide (in an amount for obtaining pH = 8.0) | |
| monoethylene glycol (in an amount to complete the composition up to 100%) | |

Using this antifreeze composition, an aqueous fluid is prepared with which the following measurement is taken: the anticorrosive properties according to the glassware corrosion test according to the method NF R 15-602-7:

| metal/alloy | variation in weight/specimen (in mg) |
| --- | --- |
| copper | −1.5 |
| solder | −0.7 |
| brass | −1.6 |
| steel | −0.3 |
| cast iron | +0.1 |
| aluminium | −3.3 |

EXAMPLE 6 (comparative)

An antifreeze composition based on monoethylene glycol is prepared, this composition containing by weight:

|  | % by weight |
| --- | --- |
| sebacic acid | 2.0 |
| benzimidazole | 0.05 |
| tolyltriazole | 0.2 |
| sodium hydroxide (in an amount for obtaining pH = 8.0) | |
| monoethylene glycol (in an amount to complete the composition up to 100%) | |

An aqueous fluid is prepared exactly as in Example 5, apart from using the present composition, having a reserve alkalinity identical to that of the composition of Example 5. The anticorrosion properties of the aqueous fluid according to the glassware corrosion test according to the method NF R 15-602-7 are measured:

| metal/alloy | variation in weight/specimen (in mg) |
| --- | --- |
| copper | −1.8 |
| solder | −6.3 |
| brass | −1.7 |
| steel | −0.1 |
| cast iron | +0.1 |
| aluminium | −8.0 |

The antifreeze composition of Example 5 exhibits a much better corrosion protection, particularly for solder and aluminium, than the composition of Example 6 (comparative) for an identical initial reserve alkalinity.

EXAMPLE 7 (comparative)

An antifreeze composition based on monoethylene glycol is prepared, this composition containing by weight:

|  | % by weight |
| --- | --- |
| monoethylene glycol | 93.26 |
| 2-ethyl hexanoic acid | 3.0 |
| sebacic acid | 1.5 |
| imidazole | 0.5 |
| tolyltriazole | 0.3 |
| sodium hydroxide | 1.44 |

Using this antifreeze composition, aqueous fluids are prepared with which various measurements are taken and various tests are carried out. Thus, the following are measured:

the pH according to the method ASTM-D-1287 (at a concentration of 33% by volume in aqueous solution):

pH=8.1 the reserve alkalinity (R.A.) according to the method ASTM-D-1121: RA=12.8 ml N/10 HCl the anti corrosive properties according to the glassware corrosion test according to the method NF R 15-602-7:

| metal/alloy | variation in weight/specimen (in mg) |
| --- | --- |
| copper | −2.1 |
| solder | −2.4 |
| brass | −1.5 |
| steel | +0.2 |
| cast iron | +1.3 |
| aluminium | −4.2 | the test of corrosion by heat transfer on aluminium alloy according to the method NF R 15-602-8:

|  | before test | after test |
| --- | --- | --- |
| pH | 8.4 | 8.0 |

Rate of corrosion (mg/cm$^2$/week): −0.52

The test of corrosion by heat transfer on aluminium alloy shows that the antifreeze composition of Example 1 exhibits a much better protection for aluminium at high temperature (150°) than the antifreeze composition of Example 7 (comparative) having a similar reserve alkalinity.

The glassware corrosion test also shows a much higher protection for solder and aluminium in Example 1 than in Example 7 (comparative).

We claim:

1. An antifreeze composition containing a water-soluble liquid alcohol capable of lowering the freezing point of an aqueous heat transfer fluid, and a corrosion inhibitor system wherein the said corrosion inhibitor system comprises:

(a) from 0.1 to 10% by weight of a mixture of at least two dicarboxylic acids selected from two distinct groups, the first group consisting of $C_3$-$C_6$ aliphatic dicarboxylic acids and the second group consisting of $C_7$-$C_{16}$ aromatic or aliphatic dicarboxylic acids, or of at least two alkali metal, ammonium or amine salts of the said acids, (b) from 0.01 to 2% by weight of at least one 1,3-diazole selected from the group consisting of imidazole, benzimidazole, imidazoline and the hydrocarbon derivatives thereof, and (c) from 0.01 to 1% by weight of at least one triazole compound.

2. Composition according to claim 1, characterized in that the dicarboxylic acids are selected from the group consisting of malonic acid, aspartic acid, glutamic acid, glutanic acid, succinic acid, glutaric acid, adipic acid, azelaic acid and sebacic acid.

3. Composition according to claim 1, characterized in that the 1,3-diazole is benzimidazole or a hydrocarbon derivative of benzimidazole.

4. Composition according to claim 1, characterised in that the 1,3-diazole is imidazole or a hydrocarbon derivative of imidazole.

5. Composition according to claim 1, characterised in that the triazole compound is an aromatic triazole compound.

6. Composition according to claim 1, characterised in that the triazole compound is benzotriazole or tolyltriazole.

7. Composition according to claim 1, characterised in that the corrosion inhibitor system comprises a mixture of benzotriazole and tolyltriazole.

8. Composition according to claim 1, characterised in that the triazole compound is an N-substituted benzotriazole or tolyltriazole derivative.

9. Composition according to claim 1, characterised in that it is substantially free of silicate, phosphate, molybdate and/or borate of an alkali metal, and/or of nitrite or nitrate of an alkali metal or alkaline-earth metal.

10. Aqueous heat transfer fluid having a lowered freezing point, containing water and from 10 to 90% by weight of the antifreeze composition according to claim 1.

11. Process for the treatment of an aqueous fluid containing a water-soluble liquid alcohol which lowers the freezing point of said aqueous fluid, in order to reduce the corrosion of metals in contact with the fluid, by addition of a corrosion inhibitor system, characterised in that the corrosion inhibitor system comprises:

(a) from 0.1 to 10% by weight of a mixture of at least two carboxylic acids selected from two distinct groups, the first group consisting of $C_3$–$C_6$ aliphatic dicarboxylic acids and the second group consisting of $C_7$–$C_{16}$ aromatic or aliphatic dicarboxylic acids, or of at least two alkali meal, ammonium or amine salts of the said acids, (b) from 0.01 to 2% by weight of at least one 1,3-diazole selected from the group consisting of imidazole, benzimidazole, imidazoline and the hydrocarbon derivatives thereof, and (c) from 0.01 to 1% by weight of at least one triazole compound.

* * * * *

UNITED STATES PATENT AND TRADEMARK OFFICE
CERTIFICATE OF CORRECTION

PATENT NO. : 5,723,061
DATED : March 3, 1998
INVENTOR(S) : CLAUDE CIARDI ET AL

It is certified that error appears in the above-identified patent and that said Letters Patent is hereby corrected as shown below:

Column 9, line 34, "sebacic" should read --succinic--.

Signed and Sealed this

Sixteenth Day of June, 1998

Attest:

BRUCE LEHMAN

Attesting Officer

Commissioner of Patents and Trademarks